Patented Sept. 14, 1937

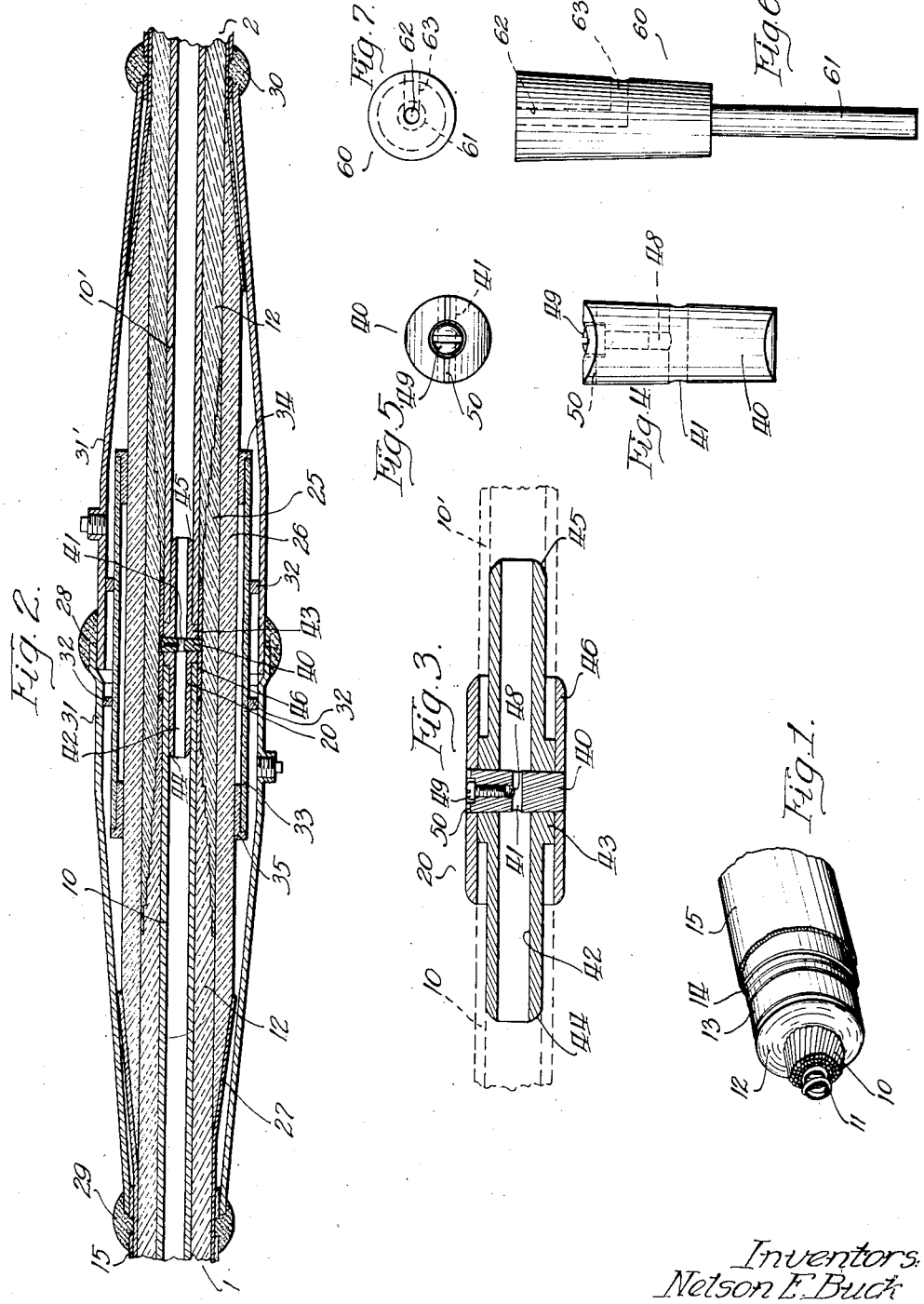

2,093,305

UNITED STATES PATENT OFFICE 2,093,305

CABLE JOINT

Nelson E. Buck and Denney W. Roper, Chicago, Ill., assignors to General Electric Company, Schenectady, N. Y., a corporation of New York Original application November 12, 1928, Serial No. 318,793. Divided and this application May 12, 1930, Serial No. 451,582

1 Claim. (Cl. 173—268)

This application is a division of our application Serial No. 318,793, filed November 12, 1928.

This invention relates to cable joints, and more particularly to joints in cables employing a liquid dielectric wherein a duct is provided for the dielectric. It is a particular object of the present invention to provide an improved joint between the ducts of adjacent cable sections and also an improved connection between the conductors of adjacent cable sections.

Oil filled cables may be of the single conductor type or of the multi-conductor type. For the highest voltages single conductor cable is required. The cable contains a hollow stranded conductor filled with an insulating oil which impregnates the paper insulation surrounding the conductor and which lies between the conductor and the enclosing lead sheath.

The oil within the cable must be gas free and great precautions are taken to prevent the contamination of the oil by air or other impurities. The cable as initially installed may be filled with gas free oil and maintained under pressure by suitable means, for instance such as is disclosed in our parent application Serial No. 318,793, filed November 12, 1928, or it may be of the type adapted to be first evacuated and then filled with oil after installation in the conduit. The cable to be installed is shipped on reels in the usual manner and is of such length as to reach from one manhole or splicing chamber to the next. After installation of the cable lengths in the conduit the several consecutive lengths are connected by joints, the joints being made so that the oil ducts between the consecutive cable lengths or sections are continuous. If the cable installed is of the type that is initially filled with oil it is necessary to prevent too great a loss of oil during the time that a joint is being made and to assure the maintenance of a gas free condition of the oil in the cable. To achieve this result we provide a connector of an improved construction for joining the ducts, said connector being provided with a valve which may be closed off during the making of the connection between the oil ducts.

After the cable is installed it is of course subject to failure or to external damage to the lead sheath. In either case, the removal of the lead sheath locally, or the making of any small hole in the sheath, or the development of a crack in the sheath due to defective workmanship or material at the factory, will provide a passage through the lead sheath through which the oil may flow. To repair the line it is necessary to first determine the location of the length of cable in trouble, and then open up the joints at the two ends of the defective length of cable so as to remove this length. It is also necessary to close off the ducts of the two cable lengths at the opposite ends of the defective section. If this were done then since the oil in the interior of the cable is under pressure there would be a tendency for the oil to flow from openings in the two adjacent lengths and, unless provision were made to the contrary, air, moisture, or water would flow into this hollow interior, damaging the insulation.

It is an object of the present invention to construct a cable joint in such a manner as to limit the possible consequential damage resulting from an injury in a portion of the cable sheath, and to confine the effect of cutting out and replacing one or more cable lengths to only the length replaced. The essence of our invention resides in making a cable joint in such a manner that the entrance of air, moisture, or other impurities into the cable is prevented both in the initial cable installation, in cases where the cables to be installed are shipped full of oil, and also in the replacement of a defective or injured section of cable, without permitting a too great loss of oil in either case. It has been customary to provide a sleeve for connecting the oil ducts of consecutive lengths of cable. It is one of the objects of the present invention to provide this sleeve with a valve seat into which may be placed a valve for closing off the communication between the oil ducts in adjacent lengths. This valve is provided with a passageway for permitting selective communication between the oil ducts on either side thereof and the outside of the sleeve. This passageway may be used to permit a slight outward flow of oil for a short while after the making of a joint in cases where the cable section installed is initially filled with oil, or it may be used for evacuation purposes in cases where the cable as initially installed is not filled with oil.

Prior to the completion of the joint the valve is removed and is replaced by a tapered plug which is provided with a passageway for permitting communication between the adjacent oil ducts. Thereafter insulation is applied to the joint and the joint is completed in the usual manner.

The attainment of the above and further objects of the present invention will be apparent from the following specification taken in conjunction with the accompanying drawing forming a part thereof.

In the drawing:

Figure 1 is an isometric view of the end of a typical form of cable to which our improved connector is applicable;

Figure 2 is a longitudinal vertical section of one form of permanent joint employing our connector;

Figure 3 is a longitudinal section of the connector sleeve for joining the hollow conductors of the cables shown in Figure 1;

Figure 4 is an enlarged side view of the ported plug used with our connector;

Figure 5 is a top plan view of the same;

Figure 6 is an enlarged view of a valve used while making the joint, or while making repairs thereto; and Figure 7 is a top plan view of the same.

Reference may now be had more particularly to the drawing wherein we have shown our improved connector applied to a cable joint which is otherwise of a well known construction and forms no part of the present invention. The cables joined by this joint are also of a construction well known in the art and do not, per se, form a part of the present invention. The cable is constructed as shown in Figure 1. It has a copper conductor 10 which is formed of several layers of strands having a helical twist, successive layers being twisted in opposite directions, and the inner layer resting on a spiral metallic tape 11. The spiral tape provides an internal passageway or duct through which oil is permitted to flow, said duct forming a passageway for the insulating oil to reach all parts of the cable insulation within the lead sheath. The copper conductor 10 is surrounded with wrapped paper tape insulation 12. This paper tape is carefully evacuated and impregnated with insulating oil. Outside of the paper insulation a suitable sheath or armor is provided, this comprising a first lead sheath 13, a wrapping of hard drawn copper tape 14 between layers of impregnated paper, and an external lead sheath 15 so as to present a smooth surface while the cable is being drawn into the conduit. The reason for the reenforcement of the sheath is the high internal pressure to which the cable is subjected. Also, a suitable single lead sheath may be used.

Reference may now be had to Figure 2 showing the construction of a cable joint between two cables of the kind shown in Figure 1. In this figure we have illustrated a joint which is substantially the same as the General Electric Company's joint, differing therefrom mainly in that we have introduced a valve between the sections being joined so as to permit the shutting off of the oil flow between the sections. The valve is located in a connector indicated at 20 which is located between the cable sections being joined. This connector is of a construction such as is shown more fully in Figure 3, to which further reference will be had as the description proceeds. The cable lengths being joined are indicated by the reference numerals 1 and 2 respectively. The connector 20 and the adjacent stepped ends of the cable insulation 12 of the respective cable lengths are wrapped with suitable insulating wrappings 25 and 26. Metal tape 27 is wrapped spirally over the tapered ends of the insulation 26 at the end, and a divided sheet metal sleeve is joined at the center by a wiped joint 28, the ends of the sleeve being tapered down to substantially the diameter of the lead sheath 15 and joined thereto by wiped joints as indicated at 29 and 30. The sleeve is indicated by the reference numerals 31 and 31' and the joint is centered in the sleeve by internal braces 32 resting against an inner insulating sleeve 33 supported upon blocks of insulation 34 and 35 resting upon the insulation 26. During the initial laying of the cable and during the making of repairs upon the cable, especially such repairs as necessitate the replacement of one of the cable lengths between adjacent manholes, it is necessary to use a ported plug such as is shown in Figures 6 and 7. The connector 20 is provided with a tapered valve seat into which the ported plug shown in Figure 6 is adapted to fit. When the plug shown in Figure 6 has served its purpose during the making of the repairs it is removed and the opening in the connector is plugged by a permanent valve plug 40. In order to facilitate the making of repairs in the future, the valve seat for the plug shown in Figure 6 is preferably formed in the connector 20 as initially installed, the same being closed by the plug 40. It is however within the purview of our present invention to use connectors wherein the valve seat is not initially provided. Under such conditions it would be necessary when making repairs to drill and ream the connector 20 to provide a seat for a valve plug such as is shown in Figure 6, and then close the drilled hole by a plug corresponding to the plug 40 when the plug shown in Figure 6 has served its purpose.

Reference may now be had more particularly to Figures 3, 4 and 5 showing the construction of the connector 20 and of the valve plug 40. The connector 20 comprises an inner sleeve 42 having an enlarged central portion 43 over which an outer sleeve 46 fits. A valve plug 40, of a construction such as is shown in Figures 4 and 5, fits into a tapered seat formed at the central portion of the inner and outer sleeve. Forming a tapered seat in the connector reduces the cross-section of the metal in the connector at this point and for that reason the valve plug should be of good conducting material as it serves to carry a part of the current. The plug 40 has a valve passageway 41 which communicates with the hollow cores of the cable and which may have a passageway 48 leading from the passageway 41 to the outside of the connector. The passageway 48 may normally be plugged as by a screw plug 49 except when it is desired to open communication with the oil duct in the cable, as when making repairs or the like. The plug 40 is in addition provided with a screw driver slot 50 or with other means for turning the plug to the desired position. In a similar manner the screw plug 49 is provided with a screw driver slot or other means for turning it.

In the making of the joint, the insulation 12 of each of the two abutting ends of the cable is first trimmed back only about one-half of the length of the outer sleeve 46. Thereafter the ends of the sleeve 42 are inserted into the stranded tubular conductors 10 and 10'. The ends of the sleeve portion 42 of the connector are tapered as indicated at 44 and 45 to facilitate the insertion thereof into the stranded tubular conductors 10 and 10' of the cables being connected. The stranded conductors of the cables extend substantially to the enlarged portion 43 of the sleeve 42 and the ends of the strands are covered by the outer sleeve 46. The cables are soldered or otherwise secured to the outer sleeve and also to the inner sleeve. The inner sleeve 42 effectively prevents the entrance of solder or the like into the oil duct thus avoiding any possibility of the duct becoming plugged by an excessive amount of solder or the like entering therein. After the completion of the soldering operation the insulation 12—12 is trimmed away in a stepped formation as shown in Figure 2.

As pointed out in our parent application of which this is a division, the oil duct within the cable is maintained full of oil under pressure, said oil seeping through the strands 10 of the conductor and maintaining the insulation suitably impregnated. The pressure on the oil in the duct is maintained at all times in order to keep the cable full of oil and the insulation properly impregnated even during the contraction of the cable due to a rapid cooling thereof, and also to insure an outward flow of oil at a fault, should one occur. It is essential that an outward flow of oil be maintained at a fault at all times in order to prevent the ingress of air, moisture or other impurities into the cable. Assume that a fault has occurred upon the cable system and that it has been determined, by suitable means, that this fault is located in the section of the cable indicated at 2, and further that this fault is of such a nature that it will be necessary to remove the faulty section and replace the same by another section. The end of the cable section 2 is cut off at a point slightly spaced from the joint indicated in Figure 2 and the cut end of the cable 2 that lies adjacent the side of the joint is suitably capped to prevent an excessive loss of oil. Prior to the capping of the section a limited amount of oil is permitted to escape from the cable in order to make certain that no foreign matter has contaminated the oil that remains within the good section of the cable. The sleeve 31' is slipped back from the joint and thereafter a portion of the insulation 25 and 26 on the side of the defective cable is removed. This exposes the top of the ported plug 40 which is then turned to close off the duct on the left-hand side thereof. The closing off of this plug prevents a further loss of oil from the cable section 1 to the faulty portion of the cable section 2. Further loss of oil from the good cable at the left of Figure 1 is now prevented except for the small seepage of oil through the insulation at the good end. This is reduced by the insulation which still remains on the end of the good cable at the joint thereof.

Thereafter more of the insulation is removed to permit the removal of the plug 40 and the substitution therefor of a plug 60 of the kind shown in Figures 6 and 7. This last mentioned plug is a temporary plug and is made of aluminum or other material which will not readily amalgamate, solder or otherwise become bound to copper connector or to the solder which is used in conjunction therewith. This ported plug 60 has a tapered conical body with a shank portion 61 which is reduced in diameter to constitute a stem portion. There is a central axial passageway 62 extending from the larger end of the plug 60 down to the central part where the plug seats in the tapered hole in the connector so that a transverse opening 63 therein may be brought into communication with either side of the bore in the sleeve 42 as desired. The diameter of the plug 60 is larger than the diameter of the transverse bore in the inner sleeve of the connector so that a complete seat for the plug is formed, thereby in effect forming the copper connector into a shut-off cock or shut-off and drain cock. The ported plug is put in place in its seat in the copper connector with the drain passageway in communication with the bore of the faulty cable end.

Now, by careful application of molten solder to the right hand end of the connector sleeve 46 and the exposed end thereof the conductor 10' may be unsoldered from the connector. During the unsoldering operation the mass of oil impregnated insulation that is surrounding the left hand side of the connector is in intimate contact therewith and has sufficient cooling properties to prevent, on careful handling, the unsoldering of the left hand end of the connector. Thereafter the end of a new cable which has been suitably prepared and which may be filled with oil is brought into position and its conductor is inserted into the connector in the place previously occupied by the conductor 10'. The joint is then completed in a manner such as is pointed out more particularly in our pending parent application Serial No. 318,793 filed November 12, 1928, of which this application constitutes a division. Since the manner of making the joint is not a part of the invention claimed in the present application a further description thereof is not deemed necessary herein, but reference may be had to the above referred to application. It may be sufficient to state that prior to the replacement of the insulation such as 25 and 26 the temporary plug 60 is removed and the permanent plug 40 is again inserted into the connector 20, the plug 60 having been used to permit a draining of the oil adjacent the joint, which oil has been subject to a possible contamination. If the new cable installed was not filled with oil at the time of installation in the duct then this plug 60 was used during the process of evacuation of the new length cable and the filling thereof with oil, as pointed out in our above referred to application.

In compliance with the requirement of the patent statutes we have herein shown and described a preferred embodiment of our invention. It is however to be understood that the invention is not limited to the precise form herein shown, the same being merely illustrative of the invention. What we consider new and desire to secure by Letters Patent is:

In a cable joint, the combination with adjacent lengths of cable having insulated hollow core conductors, said cores being full of fluid, of a hollow sleeve having a relatively thick central body and sockets on opposite sides thereof to receive and secure the conductor ends, said body having a transverse bore and a permanently installed metal valve plug fitting the bore which assists in carrying current between the conductors, said plug having a through passage, the ends of which register with the cores, and also a radial passage communicating with the through passage and with the outside of the sleeve, and a closing means for the radial passage, whereby by manipulation of the plug and the closing means, communication may be established between the cores and also between the through passage and the outside of the plug and sleeve when they are exposed, a body of insulation which covers the hollow connecting sleeve, valve plug and the means after the plug and means are adjusted to their final positions, and an enclosing casing for the joint.

NELSON E. BUCK.
DENNEY W. ROPER.